United States Patent
Mather (10) Patent No.: US 6,938,925 B2
(45) Date of Patent: Sep. 6, 2005

(54) APPARATUS FOR USE ON A SAFETY BELT SYSTEM FOR RESTRAINING THE MOVEMENT OF AN OCCUPANT OR CHILD SEAT

(75) Inventor: Bruce A. Mather, Hockessin, DE (US)

(73) Assignee: Lap Belt Cinch, Inc., Hockessin, DE (US)

( * ) Notice: Subject to any disclaimer, the term of this patent is extended or adjusted under 35 U.S.C. 154(b) by 106 days.

(21) Appl. No.: 10/219,563

(22) Filed: Aug. 15, 2002

(65) Prior Publication Data

US 2003/0173766 A1 Sep. 18, 2003

Related U.S. Application Data

(60) Provisional application No. 60/364,882, filed on Mar. 14, 2002.

(51) Int. Cl.$^7$ .............................................. B60R 22/48
(52) U.S. Cl. ...................... 280/801.1; 280/808; 24/170; 24/191
(58) Field of Search .............................. 280/801.1, 804, 280/808; 24/170, 191, 196

(56) References Cited

U.S. PATENT DOCUMENTS

| | | | |
|---|---|---|---|
| 3,913,977 A | * 10/1975 | Takada | 297/476 |
| 4,310,175 A | * 1/1982 | Pickett | 280/801.1 |
| 4,371,192 A | 2/1983 | Alix | 280/801 |
| 4,486,031 A | 12/1984 | Holler et al. | 280/802 |
| 4,726,625 A | * 2/1988 | Bougher | 297/483 |
| 4,935,994 A | * 6/1990 | Boone et al. | 24/196 |
| 5,000,481 A | 3/1991 | Willson | 280/808 |
| 5,058,244 A | * 10/1991 | Fernandez | 24/170 |
| 5,100,176 A | * 3/1992 | Ball et al. | 280/801.1 |
| 5,138,749 A | * 8/1992 | McCune et al. | 24/196 |
| 5,222,278 A | 6/1993 | Ball et al. | 24/198 |
| 5,311,653 A | * 5/1994 | Merrick | 24/196 |
| 5,350,196 A | 9/1994 | Atkins | 280/808 |
| 5,548,874 A | 8/1996 | Mishina et al. | 24/170 |
| 5,788,282 A | 8/1998 | Lewis | 280/808 |
| 5,870,816 A | 2/1999 | McFalls et al. | 29/434 |
| 5,983,463 A | * 11/1999 | Prentkowski et al. | 24/196 |
| 6,139,059 A | 10/2000 | Metzger | 280/808 |
| 6,213,508 B1 | 4/2001 | Cornell | 280/801.1 |
| 6,631,537 B1 | * 10/2003 | Huang | 24/193 |

* cited by examiner

Primary Examiner—Paul N. Dickson
Assistant Examiner—Toan C To
(74) Attorney, Agent, or Firm—Moser, Patterson & Sheridan, LLP (57) ABSTRACT

An apparatus for reversibly locking a lap belt portion of a belt webbing in a three-point, continuous loop seat belt system which includes a tongue assembly having the belt webbing routed therethrough, includes a cinch body adapted to mount to the tongue assembly, and a cam coupled to the cinch body and adapted to urge the belt webbing against the cinch body.

23 Claims, 11 Drawing Sheets

APPARATUS FOR USE ON A SAFETY BELT SYSTEM FOR RESTRAINING THE MOVEMENT OF AN OCCUPANT OR CHILD SEAT

CROSS REFERENCE TO RELATED APPLICATIONS

This patent application claims the benefit of U.S. Provisional Application Ser. No. 60/364,882, filed Mar. 14, 2002, which is incorporated herein by reference in its entirety.

FIELD OF THE INVENTION

This invention relates to the field of passenger restraint systems and, more specifically, to safety belts.

BACKGROUND OF THE INVENTION

A typical and known vehicle seat belt system is a three-point continuous loop seat belt system. A three-point continuous loop seat belt system includes a seat belt retractor and a length of belt webbing. The belt webbing extends from the retractor through a D-ring fixed to the vehicle and then down to an anchor point near the vehicle floor. A tongue assembly is slidable (freely moveable) along the length of belt webbing between the D-ring and the anchor point. To use the seat belt system, a vehicle occupant grasps the tongue assembly, pulling the belt across his/her body, and inserts a portion of the tongue assembly into a buckle. When the tongue assembly is fastened in the buckle, a portion of the belt webbing extends across the lap of the vehicle occupant and a portion of the belt webbing extends diagonally across the torso of the vehicle occupant. When the tongue assembly is released from the buckle, the belt webbing is rewound by the retractor.

The tongue assembly needs to slide freely along the belt when the occupant moves the tongue assembly toward the buckle to provide simple and convenient belt length adjustment because not all drivers are the same size, and to compensate for clothing thicknesses such as the use of jackets in the winter. The tongue assembly should also slide along the belt after the occupant unlocks the tongue assembly from the buckle so that the retractor can fully wind up the belt. The retractor would otherwise carry the tongue assembly upwardly to the D-ring, whereupon further movement of the belt would be prevented as the D-ring blocked further movement of the tongue assembly. Free movement of the belt webbing through the tongue is also critical since locking or tightening of the shoulder belt portion must lock or tighten the lap belt portion.

In most modern vehicle seat belt systems, the seat belt retractor remains "unlocked". This permits slack in both the shoulder belt and lap belt portions. The objective of allowing the slack is to permit driver comfort and the ability to reach forward (as to adjust a radio) without having to loosen or unbuckle the seat belt. However, in the event of an accident the seat belt retractor locks, thus preventing further forward motion of the occupant during deceleration. In many modern systems, a "pre-tensioner" mechanism proactively tightens the seat belt by retracting the shoulder belt under great force for increased occupant restraint. The pre-tensioning retraction of the shoulder belt also tightens the lap belt portion because the continuous belt web slides freely through the tongue. This is an important safety feature intended to provide lower body restraint.

The above-described genres of typical seat belts have numerous failings in several common areas of seat belt use: during high performance and off-road driving, loose lap belts allow the driver and passengers to slide in their seats thus causing loss of optimum vehicle control; loose lap belts allow "slumping" or "slouching" which can become tiring and induce fatigue during multi-hour trips; and when a child seat is used, loose lap belts permit unsafe seat movement and potentially dangerous stability situations. In all common events, the slack of the typical seat belt design fails to provide a desired degree of controllable restraint in non-accident situations because the lap belt portion is loose.

SUMMARY OF THE INVENTION

The invention comprises an apparatus for use in a safety belt system for restraining the movement of an occupant or a child seat.

In one embodiment of the present invention, an apparatus for reversibly locking a lap belt portion of a belt webbing in a three-point, continuous loop seat belt system which includes a tongue assembly having the belt webbing routed therethrough, includes a cinch body adapted to mount to the tongue assembly, and a cam coupled to the cinch body and adapted to urge the belt webbing against the cinch body.

In another embodiment of the present invention, an apparatus for reversibly locking a lap belt portion of a belt webbing in a three-point, continuous loop seat belt system which includes a tongue assembly having the belt webbing routed therethrough, includes a cinch body, a cam carrier assembly and a release arm.

The cinch body has an upper frame and a lower frame, wherein the upper frame comprises axially spaced, oppositely disposed first and second arms separated by a base. The first arm has a first notch extending axially away from the second arm, and the second arm has a second notch extending axially away from the first arm, wherein the first notch and the second notch are used to mount and align a cam carrier assembly to the cinch body. The lower frame comprises axially spaced, oppositely disposed first and second arms, the first arm being attached to the upper frame of the cinch body, and the first arm and the second arm used to attach the tongue assembly to the cinch body.

The cam carrier assembly, including a cam, is mounted to the cinch body such that the first length of belt webbing routed through the tongue assembly is locked between the base of the cinch body and the cam.

A release arm, coupled to the cam, is used for rotating the cam such that the first length of belt webbing routed through the tongue assembly can thereby be manually released from the base of the cinch body allowing movement of the cinch body, the mounted cam carrier assembly, and the tongue assembly along the belt of the safety belt system.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention will be described within the context of a factory-installed, three-point, continuous loop seat belt system and associated devices that help restrain the movement of an occupant of an automobile or of a child seat in an automobile. However, it will be appreciated by those skilled in the art that the subject invention may be advantageously employed to provide a means for securing safety and other belt systems of various types and in vehicles of various types. It will also be appreciated by those skilled in the art that the subject invention may be designed to be retrofit (added after manufacture of the seat belt) or built into a seat belt or child safety car seat at the time of manufacture. Thus, it is contemplated by the inventors, that the subject invention has broad applicability beyond the specific automobile seat belt system described herein.

Figure 1A:
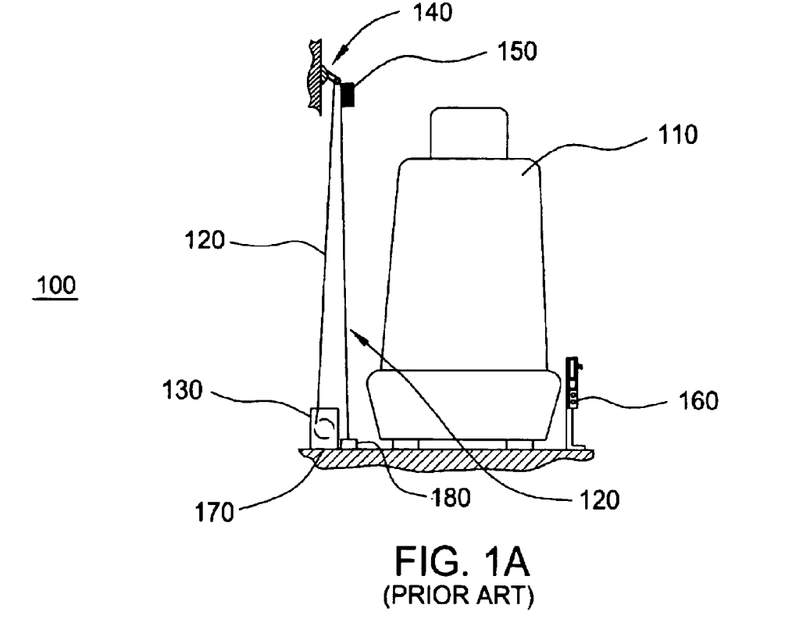
FIG. 1a depicts an embodiment of a typical, factory-installed, three-point, continuous loop seat belt system as found in most modern automobiles, in the retracted position.

FIG. 1a depicts an embodiment of a typical, factory-installed, three-point, continuous loop seat belt system 100 as found in most modern automobiles, in the retracted position. The seat belt system 100 of FIG. 1a includes, an automobile seat 110, a length of seat belt webbing 120, a seat belt retractor 130, a D-ring 140, a tongue assembly 150, and a buckle 160. During the operation of an automobile, the occupant of the automobile sits on the automobile seat 110, illustratively a front passenger seat, and is typically restrained in the seat 110 by a seat belt system as the one depicted in the FIG. 1a. One end of the length of seat belt webbing 120 is anchored to the automobile body 170 at an anchor point 180 located to one side of the automobile seat 110. The opposite end of the belt webbing 120 is attached to the seat belt retractor 130, which is secured to the automobile body 170 on the same side of the automobile seat 110 as the anchor point 180. Intermediate to its ends, the seat belt webbing 120 passes through the tongue assembly 150 and the D-ring 140 that is located above the seat belt retractor 130 and the anchor point 180. When the seat belt system is not in use (i.e., in its stowed condition) the excess belt webbing 120 is wound in the seat belt retractor 130 and is oriented generally vertically on the one side of the automobile seat 110, as depicted in FIG. 1.

Figure 1B:
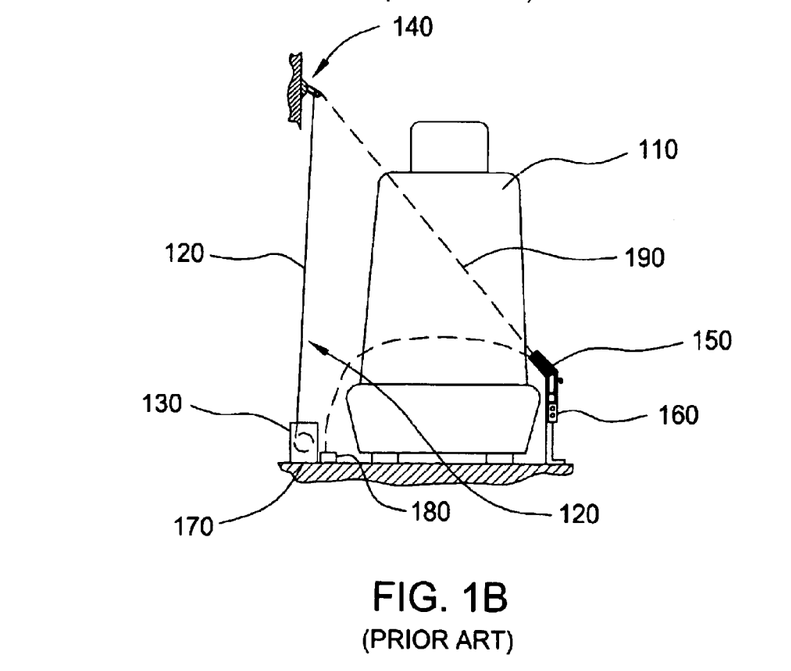
FIG. 1b depicts the seat belt system of FIG. 1a in the engaged position.

FIG. 1b depicts the seat belt system 100 of FIG. 1a in the engaged position. To engage the seat belt system 100, the tongue assembly 150 is manually grasped and is pulled across the lap and torso of the occupant sitting in the automobile seat 110. As the tongue assembly 150 is pulled across the lap and torso of the occupant, the tongue assembly 150 slides freely along the belt webbing 120, and the belt webbing 120 is unwound under mild tension from the seat belt retractor 130. When the belt webbing 120 has been pulled across the lap and torso of the occupant, the tongue assembly 150 is engaged with the buckle 160. The buckle 160 is anchored to the automobile body 170 and is disposed to a side of the automobile seat 110 opposite the anchor point 180. When the seat belt system 100 is buckled, the length of the belt webbing 120 is divided by the tongue assembly 150 into a shoulder (torso) portion 190, which extends between the D-ring 140 and the engaged tongue assembly 150, and a lap portion 192, which between the engaged tongue assembly 150 and the anchor point 180.

It should be noted that any application of tension (such as leaning forward against the seat belt) easily counteracts the mild tension of the seat belt retractor 130 and permits the shoulder portion 190 and/or lap portion 192 to increase in length and thus loosen. Only if the seat belt retractor 130 locks (as it is designed to do under emergency situations) will the seat belt portions 190 and 192 become of fixed length and thereby restraining.

Figure 2:
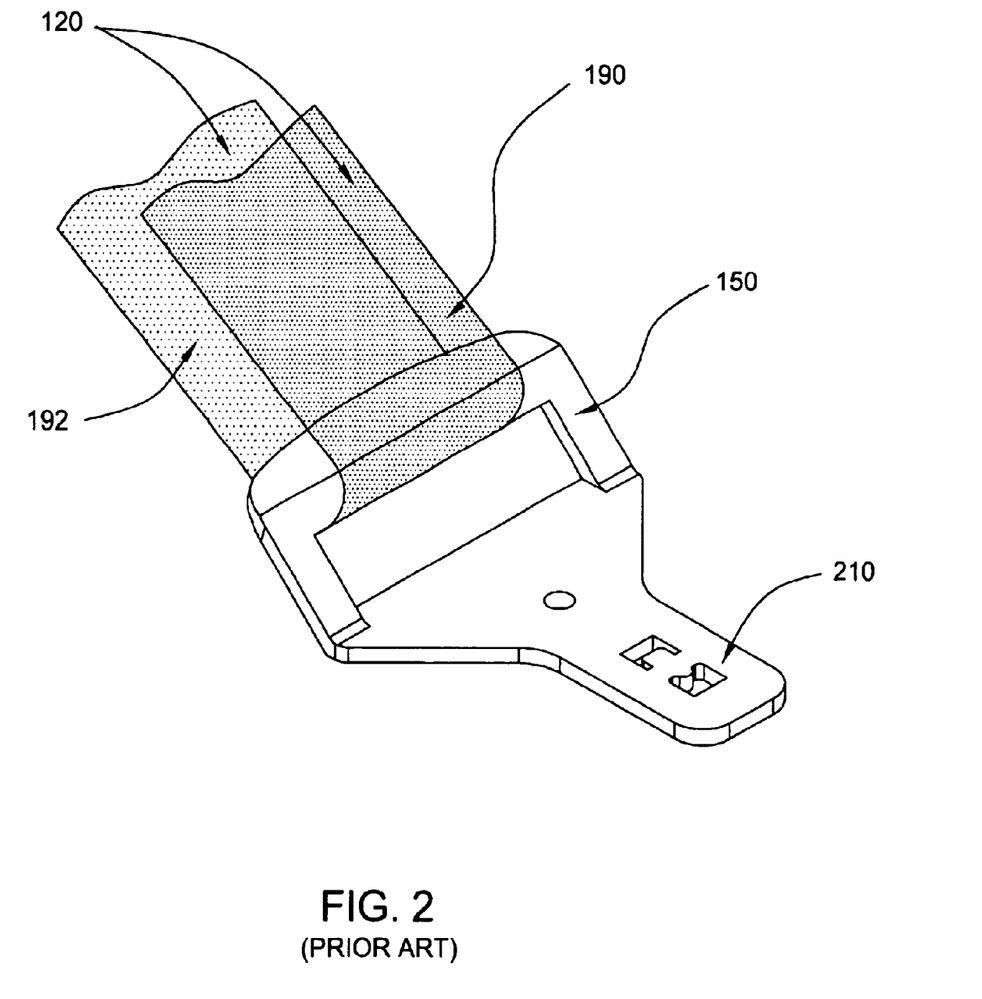
FIG. 2 depicts an embodiment of a tongue assembly, suitable for use in the seat belt system of FIG. 1a and FIG. 1b.

FIG. 2 depicts an embodiment of a tongue assembly, suitable for use in the seat belt system of FIG. 1a and FIG. 1b. The seat belt webbing 120 passes through the tongue assembly 150, which separates the continuous webbing into the shoulder portion 190 from the lap belt portion 192. The exact point of separation is variable since the tongue assembly 150 slides freely along the seat belt webbing 120 to facilitate the buckling and stowage of the seat belt system 100.

To engage the seat belt system 100, the tongue assembly 150 is grasped by the occupant, pulled across the occupant's body, unwinding additional seat belt webbing 120 from the seat belt retractor as needed, and subsequently inserted into the buckle. The tongue assembly is inserted into the buckle by the tongue lock plate 210 to secure the third point of the 3-point seat belt system 100 of FIG. 1a and FIG. 1b.

Figure 3:
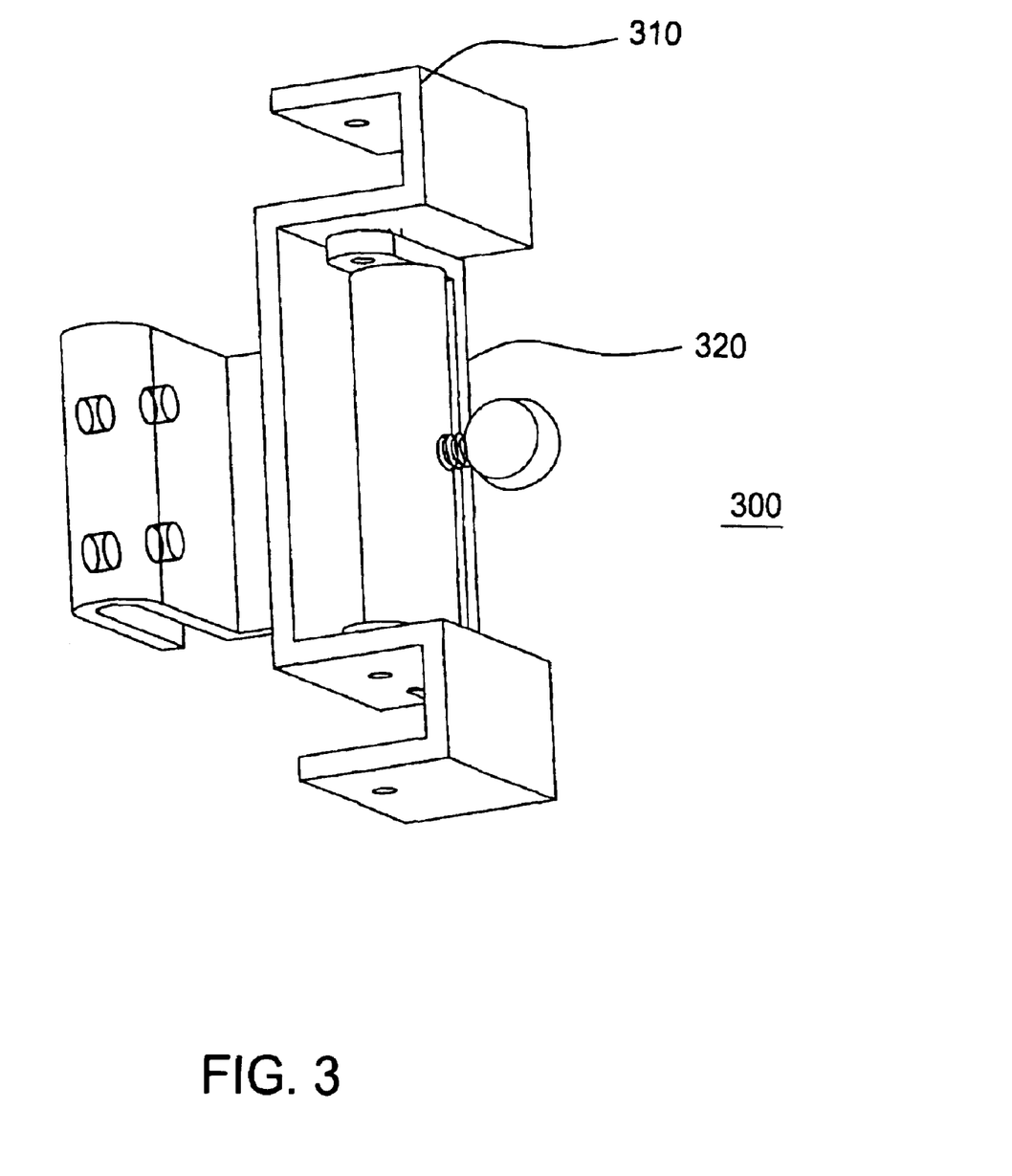
FIG. 3 is a front perspective view of an embodiment of a belt cinch.

FIG. 3 is a front perspective view of an embodiment of a belt cinch. The belt cinch in accordance with the present invention can be advantageously coupled to an existing safety belt system or incorporated as part of a safety belt system for enhancing the restraining of the movement of an occupant of a vehicle or of a child seat in a vehicle by locking the lap belt portion of the seat belt. The embodiment shown in FIG. 3 with a separate cam carrier assembly is for the retrofit version. In retrofit situations, the seat belt web must be inserted between the cam and the cam body. Since the web is permanently attached to the car at both ends the cam must be separable to permit the web insertion. In OEM embodiments, the manufacturer can insert the belt webbing before attaching the cam to the cam body. In this latter instance, the cam carrier assembly is not required.

The belt cinch in the invention is designed to grip in one direction only. This means the lap belt can be pulled tight manually by grasping the shoulder belt just above the tongue and pulling away from the tongue. The cam prevents the lap belt from loosening by resisting or preventing lengthening of the lap belt portion. However, if in the event of an accident, the seat belt pre-tensioner engages, the shoulder belt is pulled tight automatically, nearly instantaneously, and with great force. The cam will permit the lap belt portion to be further tightened by the pre-tensioner if the pre-tensioner force is greater than the manually-imposed lap belt tension. This safety feature is appropriate to prevent minimizing or negating the inherent safety features built into standard seat belts.

The belt cinch 300 of FIG. 3 includes a cinch body 310 and a cam carrier assembly 320. The cam carrier assembly 320 is coupled to the cinch body 310, such that when installed on a safety belt system the cinch body 310 provides for a means for attaching the belt cinch to the safety belt system, and the cam carrier assembly 320 provides for a means for securing the safety belt system in a desired position. The cam carrier assembly 320 is coupled to the cinch body 310 by inserting two ends of a cam axle into two notches in the cinch body 310 and securing the cam carrier assembly 320 to the cinch body 310 using attachment devices inserted through openings in the cinch body 310.

Figure 4:
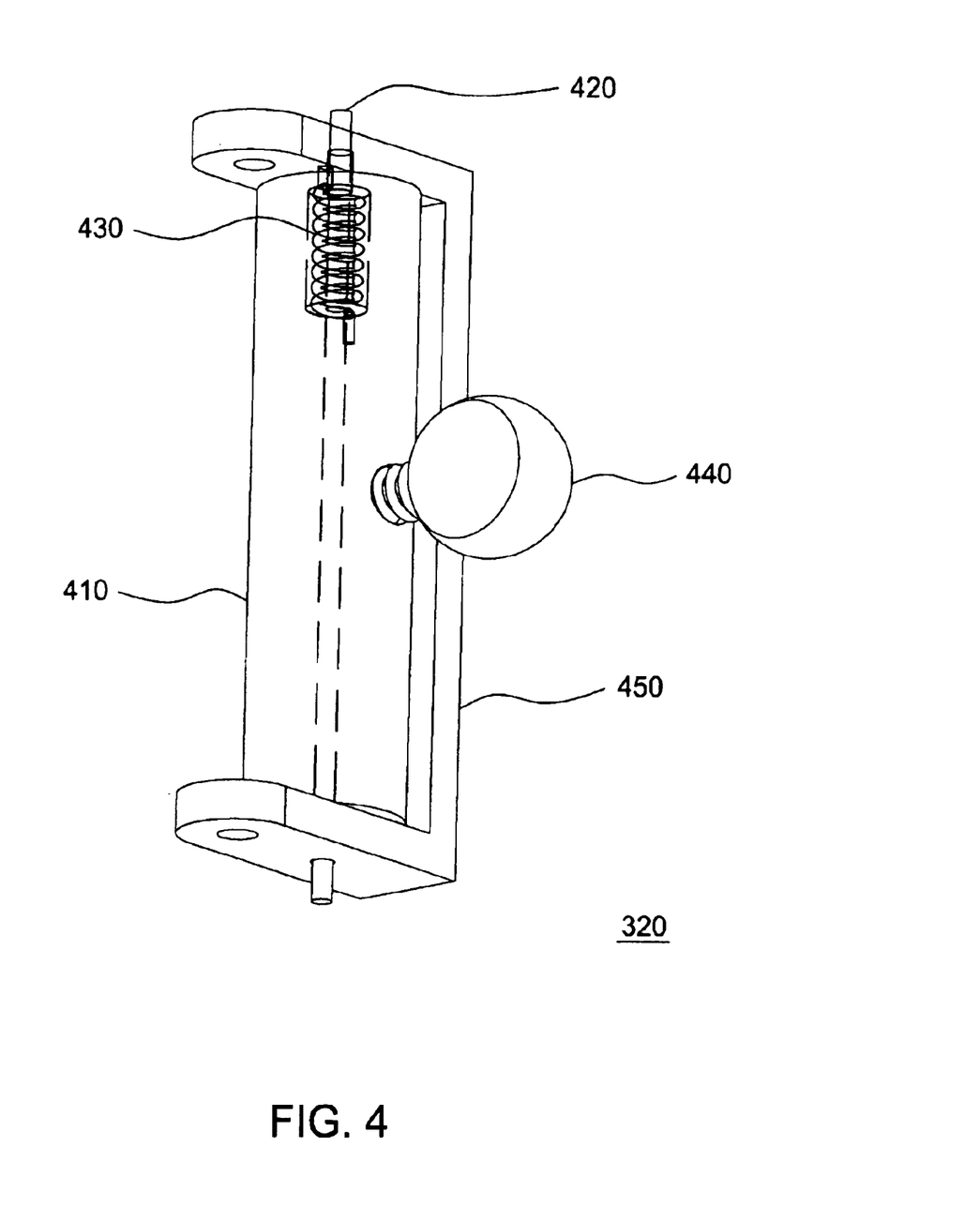
FIG. 4 depicts one embodiment of a cam carrier assembly.

FIG. 4 depicts one embodiment of the cam carrier assembly 320 of FIG. 3. The cam carrier assembly 320 can be manufactured of steel, aluminum or any other structural material. The cam carrier assembly 320 depicted in FIG. 4 is manufactured from steel. The cam carrier assembly 320 of FIG. 4 includes a cam 410, a cam axle 420, a torsion spring 430, a release arm 440, and a main carrier body 450. The cam axle 420 is inserted into an off-center opening through the cam 410. The torsion spring 430 is inserted over the cam axle 420 and into another counter-bored opening having a center on the same axis as the cam axle 420. One end of the torsion spring 430 is inserted into an opening in the face of the counter-bored opening. The assembled cam 410, cam axle 420, torsion spring 430, and release arm 440 are mounted to the main carrier body 450 by inserting the two ends of the cam axle 420 into two openings in the carrier body 450. The other end of the torsion spring 430 is inserted into another opening in the carrier body 450. Although specific embodiment of the cam 410, the cam axle 420, the torsion spring 430, the release arm 440, and the main carrier body are depicted in FIG. 4, it will be appreciated by those skilled in the art that minor alterations to the dimensions of the above listed components and slight variations in the methods of interconnection between these components will still be considered to be within the scope of the present invention.

Figure 5:
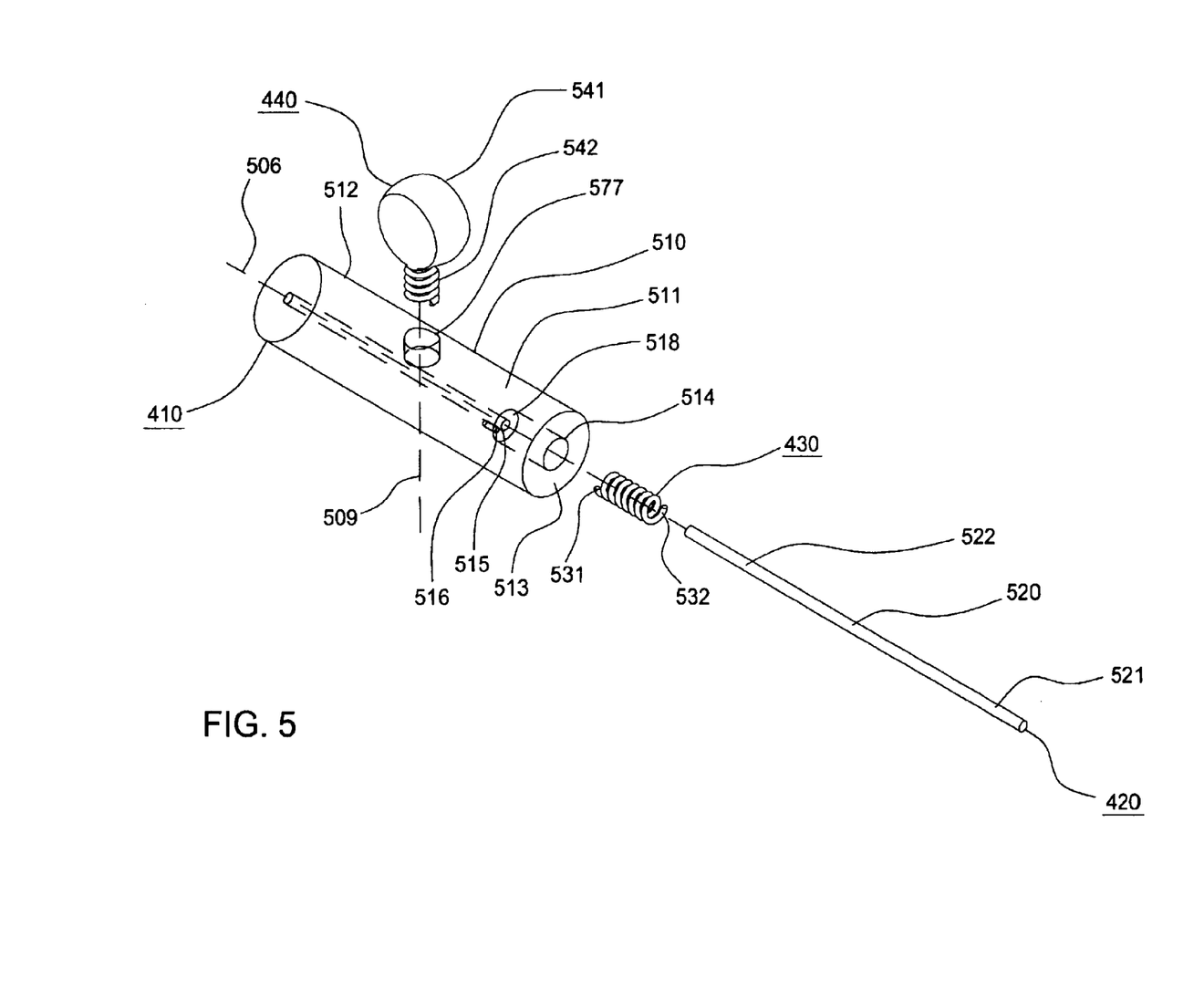
FIG. 5 depicts an exploded view of one embodiment of a cam, a cam axle, a torsion spring, and a release arm.

FIG. 5 depicts an exploded view of one embodiment of a cam 410, a cam axle 420, a torsion spring 430, and a release arm 440. The cam 410 can alternatively be manufactured of aluminum rod, steel rod (stainless, carbon steel, etc), metal tubing filled with hard plastic or epoxy, or hard structural engineering plastic. The cam 410 depicted in FIG. 5 is manufactured of steel rod. The cam 410 includes a cylindrical body portion 510 extending axially between a first end 511 and a second end 512. The first end 511 of the cam 410 includes a planar first end wall 513. The planar first end wall 513 includes a first cylindrical opening, a counter-bored hole, 514 offset from the center axis of the first end wall 513. The first cylindrical opening 514 extends axially from the planar first end wall 513, toward the second end 512, a distance less than the length of the torsion spring 430. The diameter of the first cylindrical opening 514 is slightly larger than the diameter of the torsion spring 430 such that a torsion spring 430 fits in the counter-bored hole 514. The first cylindrical opening 514 is centered on a first axis 506, which is parallel to the center axis of the cam 410. The first cylindrical opening 514 has a bottom wall 518. The bottom wall 518 includes a second cylindrical opening, a through hole, 515 having a diameter slightly larger than the diameter of the cam axle 420. The second cylindrical opening 515 extends axially from the planar second end wall 518, toward the second end 512, to the exterior of the cam 410. The second cylindrical opening 515 is also centered on the first axis 506, which is centered on the first cylindrical opening 514. The bottom wall 518 also includes a third cylindrical opening, a blind hole 516, having a diameter slightly larger than the wire diameter of the torsion spring 430. The third cylindrical opening 516 is located within the boundaries of the first cylindrical opening 514 on the bottom wall 518, offset from the center axis of the first cylindrical opening 514, and extends axially from the planar first end wall 513, toward the second end 512, a small distance. The third cylindrical opening 516 is centered on an axis, which is parallel to the axis 506 of the first and second cylindrical openings 514 and 515, respectively. The cylindrical body portion 510 of the cam 410 includes a fourth cylindrical opening (illustratively a threaded hole) 517. The fourth cylindrical opening 517 is formed in the body portion 510 of the cam 410 typically orthogonal to the axis of the body portion 510 on a second axis 509 and extends into the body portion 510 a distance enough to engage the release arm 440 to the body portion 510. Although the fourth cylindrical opening 517 is depicted as a threaded hole, a through hole can advantageously be used to secure the release arm 440 to the body portion 510 of the cam 410. Optionally, the body portion 510 of the cam 410 includes gripping devices (e.g., knurling, striations, attached grip paper, rubber coatings, and the like) to improve the rotation of the cam 410, thus locking the seat belt webbing.

One embodiment of the torsion spring 430 comprises an internal leg 531 and an external leg 532. The internal leg 531 of the torsion spring 430 is inserted into the third cylindrical opening 516 of the cam 410. The wire diameter of the torsion spring 430 is slightly smaller than the diameter of the third cylindrical opening 516 of the cam 410. When inserting the internal leg 531 of the torsion spring 430 into the third cylindrical opening 516, the body of the torsion spring 430 locates and fits into the first cylindrical opening 514 of the cam 410. The diameter of the first cylindrical opening 514 is slightly larger than the diameter of the torsion spring 430 to allow the torsion spring 430 to locate itself in the recessed first cylindrical opening 514. The depth of the recessed first cylindrical opening 514 is less than the length of the torsion spring 430, such that a portion of the torsion spring 430 extends past the cylindrical body portion 510 of the cam 410.

The cam axle 420 is preferably manufactured of a rigid material such as steel, iron or a composite having suitable characteristics. Steel, iron and other such rigid materials are appropriate to manufacture the cam axle because the cam axle requires rigidity that softer materials may not be able to provide. The cam axle 420 depicted in FIG. 5 is manufactured of steel. The cam axle 420 includes a cylindrical body portion 520 extending axially between a first end 521 and a second end 522. The second end 522 of the cam axle 420, illustrated in FIG. 5, is inserted into the second cylindrical opening 515 in the planar first end wall 513 of the cam 410. The diameter of the cam axle 420 is slightly smaller than the diameter of the second cylindrical opening 515 of the cam 410. The cam axle 420 is inserted into the cam 410, such that at this point, the second end 522 of the cam axle 420 does not protrude through the second end 512 of the cylindrical body portion 510 of the cam 410. The length of the cam axle 420 is substantially longer then the cylindrical body portion 510 of the cam 410, such that when the cam carrier assembly 320 is completely assembled, the cam axle 420 extends evenly past both ends of the cylindrical body portion 510 of the cam 410.

The release arm 440 (illustratively a threaded thumb screw) comprises a head 541 and a shaft 542. The release arm 440 can be manufactured of steel, aluminum or any other structural material. The release arm 440 depicted in FIG. 5 is manufactured from aluminum. A portion of the shaft 542 is threaded to engage with the threaded fourth cylindrical opening 517 on the cylindrical body portion 510 of the cam 410 to secure the release arm 440 to the cam 410. Although the release arm 440 is depicted as a threaded thumbscrew, other fasteners or affixing methods such as epoxy, soldering, or welding, can advantageously be used to provide attachment of the release arm 440 to the body portion 510 of the cam 410.

Figure 6:
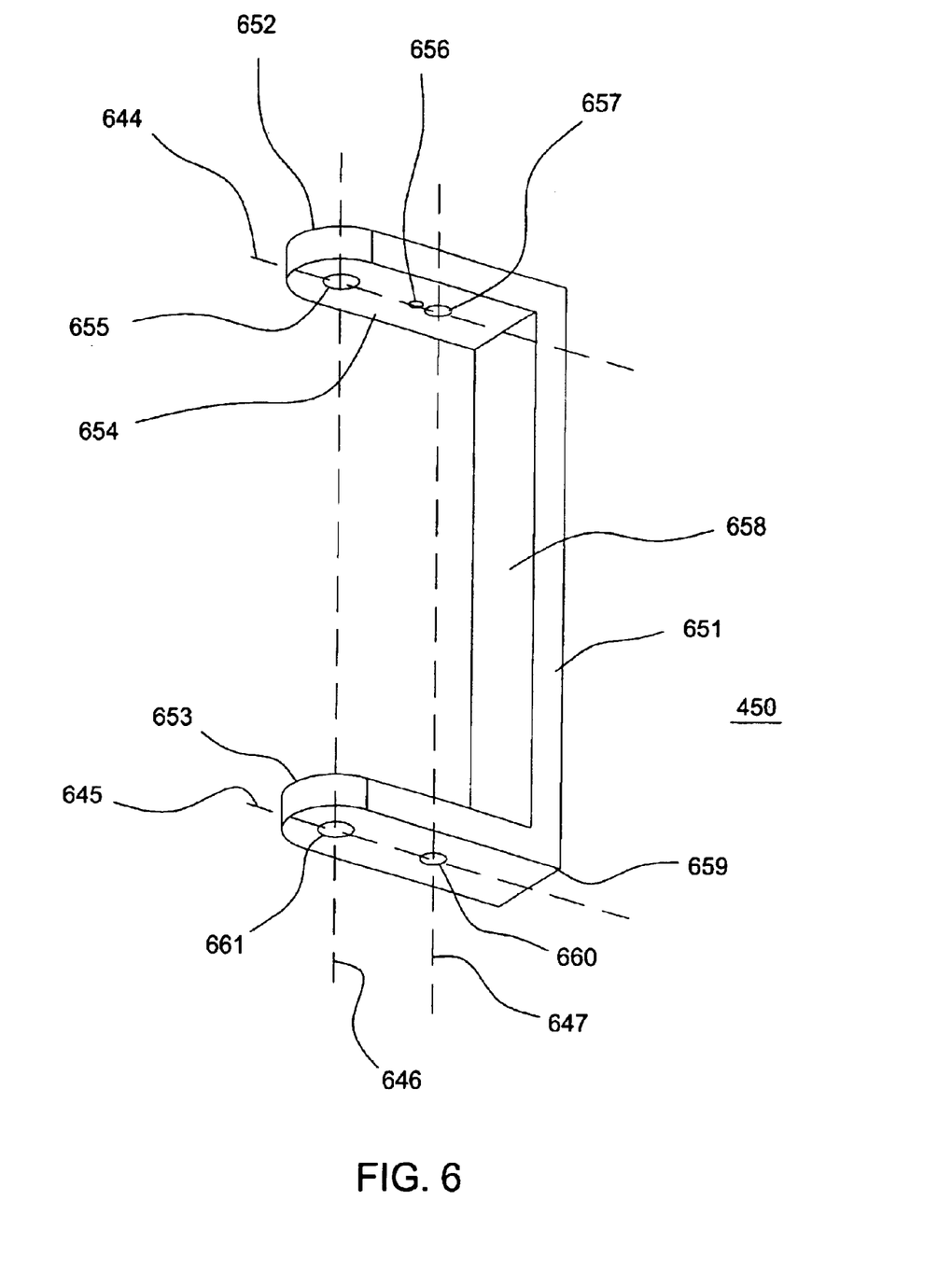
FIG. 6 depicts an embodiment of a main carrier body.

FIG. 6 depicts an embodiment of a main carrier body 450. The main carrier body 450 can be manufactured of steel, aluminum or any other strong structural material. The main carrier body 450 depicted in FIG. 6 is manufactured from steel. The main carrier body 450 comprises an elongated, channel shaped frame 651 with parallel, oppositely disposed arms 652 and 653. The first arm 652 of the main carrier body 450 is partially defined by a planar first side wall 654. The planar first side wall 654 includes three cylindrical openings 655, 656, and 657. The first cylindrical opening, a through hole, 655 extends axially from the planar first side wall 654, away from the second arm 653, to the exterior of the main carrier body 450. The first cylindrical opening 655 is centered on a first axis 644, which is perpendicular to the base 658 of the main carrier body 450 and is located on the planar first side wall 654 at a point further from the base 658 than the second cylindrical opening 656 and the third cylindrical opening 657. The second cylindrical opening, a through hole, 656 extends axially from the planar first side wall 654, away from the second arm 653, to the exterior of the main carrier body 450. The second cylindrical opening 656 is centered on the first axis 644 and is located on the planar first side wall 654 at a point further from the base 658 than the third cylindrical opening 657 but closer to the base 658 than the first cylindrical opening 655. The diameter of the second cylindrical opening 656 is slightly larger than the diameter of the cam axle 420. The third cylindrical opening, a through hole, 657 extends axially from the planar first side wall 654, away from the second arm 653, to the exterior of the main carrier body 450. The third cylindrical opening 657 is centered on the first axis 644 and is located on the planar first side wall 654 at a point closer to the base 658 than the second cylindrical opening 656 and the first cylindrical opening 655. The diameter of the third cylindrical opening 657 is larger than the width of the torsion spring 430. The first cylindrical opening 655 and the third cylindrical opening 657 are separated in the first axis 644 by an amount greater than the diameter of the cam 410.

The second arm 653 of the main carrier body 450 is partially defined by a planar second side wall 659. The planar second side wall 659 includes fourth and fifth cylindrical openings 660 and 661. The fourth cylindrical opening, a through hole, 660 extends axially from the planar second side wall 659, toward the first arm 652, to the interior of the main carrier body 450. The fourth cylindrical opening 660 is centered on a second axis 645, which is perpendicular to the base 658 of the main carrier body 450 and is located on the planar second side wall 659 at a point further from the base 658 than the fifth cylindrical opening 661. The fifth cylindrical opening, a through hole, 661 extends axially from the planar second side wall 659, toward the first arm 652, to the interior of the main carrier body 450. The fifth cylindrical opening 661 is centered on the second axis 645 and is located on the planar second side wall 659 at a point closer to the base 658 than the fourth cylindrical opening 660. The diameter of the fifth cylindrical opening 661 is slightly larger than the diameter of the cam axle 420. The fourth cylindrical opening 660 and the fifth cylindrical opening 661 are separated in the second axis 645 by an amount greater than the diameter of the cam 410.

The first cylindrical opening 655 of the first arm 652 and the fourth cylindrical opening 660 of the second arm 653 of the main carrier body 450 are centered on a third axis 646, which is parallel to the base 658 of the main carrier body 450. The third cylindrical opening 657 of the first arm 652 and the fifth cylindrical opening 661 of the second arm 653 of the main carrier body 450 are centered on a fourth axis 647, which is parallel to the base 658 of the main carrier body 450.

The assembled cam 410, cam axle 420, torsion spring 430, and release arm 440 are mounted onto the main carrier body 450. The first end 511 of the cylindrical body portion 510 of the cam 410 is mounted toward the planar first side wall 654 of the first arm 652 of the main carrier body 450. The assembly is installed into the main carrier body 450 by inserting the first end 521 of the cam axle 420 protruding through the planar first end wall 513 of the cam 410 into the third cylindrical opening 657 of the planar first side wall 654 of the first arm 652 of the main carrier body 450. The external leg 532 of the torsion spring 530 is inserted into the second cylindrical opening 656 of the planar first side wall 654 of the main carrier body 450. The second end 512 of the cylindrical body portion 510 of the cam 410 is mounted toward the second arm 653 of the main carrier body 450. The second end 522 of the cam axle 420 is inserted into the fifth cylindrical opening 661 of the planar second side wall 653 of the second arm 659 of the main carrier body 450 by applying pressure in an inward direction to the first end 521 of the cam axle 420 protruding through the planar first end wall 513 of the cam 410 until the cam axle 420 protrudes evenly out of the first end 511 of the cam 410 and the second end 512 of the cam 410. The cam carrier assembly 320 is now assembled and can be mounted onto the cinch body 310.

Figure 7:
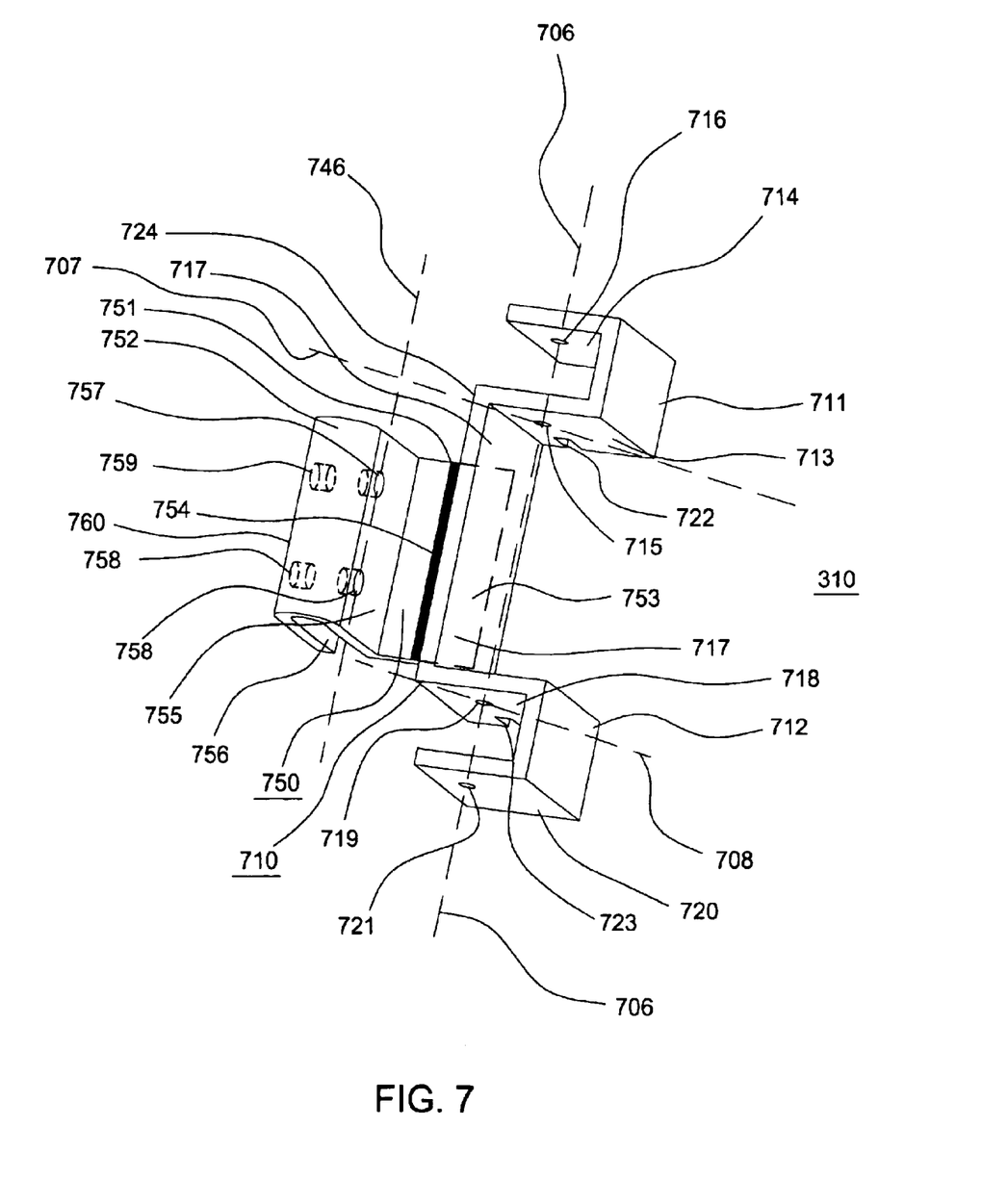
FIG. 7 depicts an embodiment of a cinch body.

FIG. 7 depicts an embodiment of a cinch body 310. The cinch body can be made of steel, aluminum or any other structural metal. The cinch body 310 depicted in FIG. 7 is manufactured from steel. The cinch body 310 of FIG. 7 illustratively comprises an upper frame 710 coupled to a lower frame 750. The cinch body 310 of FIG. 7 can be advantageously composed of a single frame or of two separate frames attached together. The cinch body 310 comprises an elongated, channel shaped upper frame 710 with parallel, oppositely disposed arms 711 and 712. The two arms 711 and 712 assume a U-shape, bent towards the outside of the channel shaped upper frame 710 at approximately a 180 degree angle. The U-shape is assumed to provide greater stability when the cam carrier assembly 320 is attached to the cinch body 310. In alternate embodiments, the U-shape can be eliminated or modified if it is determined that one side wall for each of the oppositely disposed arms 711 and 712, provides enough stability when the cam carrier assembly 320 is attached to the cinch body 310. The first arm 711 of the upper frame 710 is partially defined by a planar first side wall 713 and a planar second side wall 714. The planar first side wall 713 includes a first cylindrical opening, a through hole 715. The first cylindrical opening 715 extends axially from the planar first side wall 713, away from the second arm 712, to the exterior of the upper frame 710. The first cylindrical opening 715 is centered on a first axis 706, which is parallel to the base 717 of the upper frame 710. The planar second side wall 714 includes a second cylindrical opening, a through hole, 716. The second cylindrical opening 716 extends axially from the planar second side wall 714, away from the second arm 712, to the exterior of the upper frame 710. The second cylindrical opening 716 is also centered on the first axis 706.

The planar first side wall 713 includes a first notch 722 adjacent to the first cylindrical opening 715 and presented toward the second arm 712. The first notch 722 extends axially from the planar first side wall 713, away from the second arm 712, to the exterior of the upper frame 710. The width of the first notch 722 is slightly greater than the diameter of the cam axle 420. The length of the first notch 722 is such that when the cam carrier assembly 320 is mounted to the cinch body 310, the cam axle 420 can travel along the length of the first notch 722 enough to align the first cylindrical opening 655 in the first arm 652 of the main carrier body 450 with the first cylindrical opening 715 in the first arm 711 of the cinch body 310. The first cylindrical opening 715 in the first arm 711 of the cinch body 310 and the first notch 722 in the planar first side wall 713 are centered on a second axis 707. The location of the first notch 722 on the first arm 711 of the cinch body 310 is such that the first notch 722 is located above the base 717 of the cinch body 310 such that when the cam 410 rotates about its off-center cam axle 420 the cylindrical body portion 510 of the cam 410 comes into contact with the base 717 of the cinch body 310 before the release arm 440 comes into contact with the main carrier body 450.

The second arm 712 of the upper frame 710 is partially defined by a planar third side wall 718 and a planar fourth side wall 720. The planar third side wall 718 includes a third cylindrical opening 719. The third cylindrical opening 719 extends axially from the planar third side wall 718, toward the first arm 711, to the interior of the upper frame 710. The third cylindrical opening 719 is also centered on the first axis 706. An opening 723 in the planar third side wall 718 forms a path for the cam carrier assembly 320 to be guided onto the upper frame 710. The planar fourth side wall 720 includes a fourth cylindrical opening 721. The fourth cylindrical opening 721 extends axially from the planar fourth side wall 720, towards the first arm 712, to the interior of the upper frame 710. The fourth cylindrical opening 721 is also centered on the first axis 706.

The planar third side wall 718 includes a second notch 723 adjacent to the third cylindrical opening 719 and presented toward the first arm 711. The second notch 723 extends axially from the planar third side wall 718, toward the first arm 711, to the interior of the upper frame 710. The width of the second notch 723 is slightly greater than the diameter of the cam axle 720. The length of the second notch 723 is such that when the cam carrier assembly 320 is mounted to the cinch body 310, the cam axle 420 can travel along the length of the second notch 723 enough to align the fourth cylindrical opening 660 in the second arm 653 of the main carrier body 450 with the third cylindrical opening 719 in the second arm 712 of the cinch body 310. The third cylindrical opening 719 in the first arm 712 of the cinch body 310 and the second notch 723 in the planar third side wall 718 are centered on a third axis 708. The location of the second notch 723 on the second arm 712 of the cinch body 310 is such that the second notch 723 is located above the base 717 of the cinch body 310 such that when the cam 410 rotates about its off-center cam axle 420 the cylindrical body portion 510 of the cam 410 comes into contact with the base 717 of the cinch body 310 before the release arm 440 comes into contact with the main carrier body 450.

The lower frame 750 of the cinch body 310 of FIG. 7 comprises a channel shaped body with parallel, oppositely disposed arms 751 and 752. The first arm 751 of the lower frame 750 is disposed transverse to the long axis of the upper frame 710 and substantially coextensive with the bottom face 724 of the upper frame 710. A planar first side wall 753 of the first arm 751 of the lower frame 750 is attached to the center of the bottom face 724 of the upper frame 710. A planar second side wall 754 of the first arm 751 faces a planar third side wall 755 of the second arm 752.

The second arm 752 of the lower frame 750 assumes a U-shape, bent towards the outside of the channel at approximately a 180 degree angle. The U-shape is assumed to provide greater stability when a tongue assembly is attached to the cinch body 310. In alternate embodiments, the U-shape can be eliminated or modified if it is determined that one side wall for the second arm 752 of the lower frame 750, provides enough stability when a tongue assembly is attached to the cinch body 310. The second arm 752 is partially defined by a planar third side wall 755 and a planar fourth side wall 756. The planar third side wall 755 includes a first and second cylindrical openings, threaded through holes, 757 and 758 separated by a small amount on a fourth axis 746. The cylindrical openings 757 and 758 extend axially from the planar third side wall 755, away from the first arm 751, to the exterior of the lower frame 750. The first and second cylindrical openings 757 and 758 are centered on the fourth axis 746, which is parallel to the base 717 of the upper frame 710. The planar fourth side wall 756 includes a third and fourth cylindrical openings, threaded through holes, 759 and 760 substantially similar to the cylindrical openings 757 and 758. The cylindrical openings 759 and 760 extend axially from the planar fourth side wall 756, away from the first arm 751, to the exterior of the lower frame 750.

To mount the cam carrier assembly 320 to the cinch body 310, the first end 521 of the cam axle 420 protruding through the planar first end wall 513 of the cam 410 is inserted into the first notch 722 of the planar first side wall 713 of the cinch body 310. The second end 522 of the cam axle 420 protruding through the second end 512 of the cylindrical body portion 510 of the cam 410 is inserted into the second notch 723 of the planar third side wall 718 of the cinch body 310. The cam carrier assembly 320 is translated forward along the length of the first notch 722 and the second notch 723 until the first cylindrical opening 655 in the first arm 652 of the main carrier body 450 is aligned with the first cylindrical opening 715 in the first arm 711 of the cinch body 310, and the fourth cylindrical opening 660 in the second arm 653 of the main carrier body 450 is aligned with the third cylindrical opening 719 in the second arm 712 of the cinch body 310. At this point a fastening device (e.g., a screw, pinch or compression clamp, a bolt, a set screw, wire, a pin, or the like) is inserted through the second cylindrical opening 716 and the first cylindrical opening 715 of the first arm 411 of the cinch body 310 and also the first cylindrical opening 655 in the first arm 652 of the main carrier body 450, to secure the cam carrier assembly 320 to the cinch body 310. Additionally a fastening device is inserted through the fourth cylindrical opening 721 and the third cylindrical opening 719 of the second arm 412 of the cinch body 310 and also the fourth cylindrical opening 660 in the second arm 653 of the main carrier body 450 to secure the cam carrier assembly 320 to the cinch body 310. Alternately, adhesive, adhesive tape, epoxy, or like non-mechanical fastening can be used.

Figure 8:
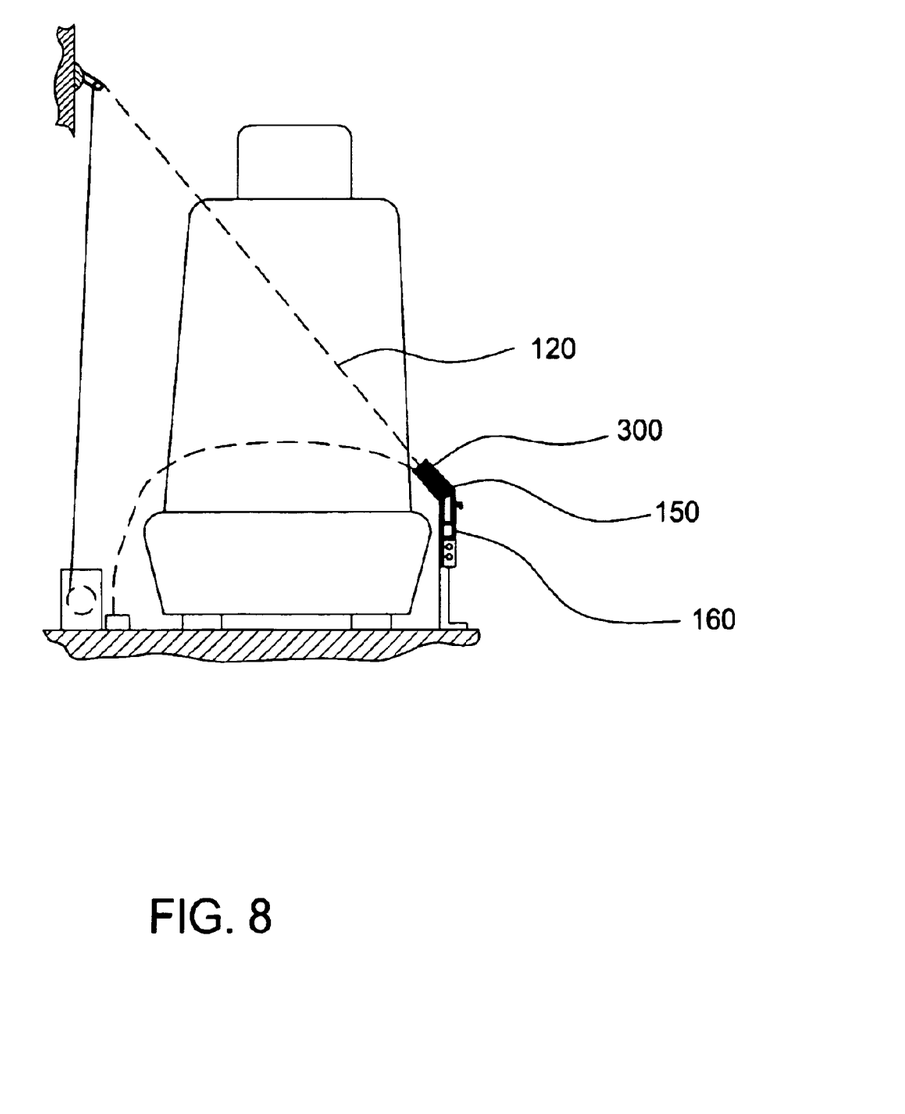
FIG. 8 depicts an embodiment of a belt cinch attached to a typical, factory-installed, three-point, continuous loop seat belt system.

FIG. 8 depicts an embodiment of a belt cinch attached to the tongue of a typical, factory-installed, three-point, continuous loop seat belt system as the one depicted in FIGS. 1a and 1b. The belt cinch 300 is attached to the tongue assembly 150 on the seat belt webbing 120 of the seat belt system 100 of FIG. 1. The tongue assembly 150 of FIG. 8 is depicted attached to the buckle 160. The belt cinch 300 advantageously locks the tongue assembly 150 onto the seat belt webbing 120 to prevent loosening of the seat belt system 100 thus restraining the movement of an occupant in a vehicle or a child seat in a vehicle.

Figure 9:
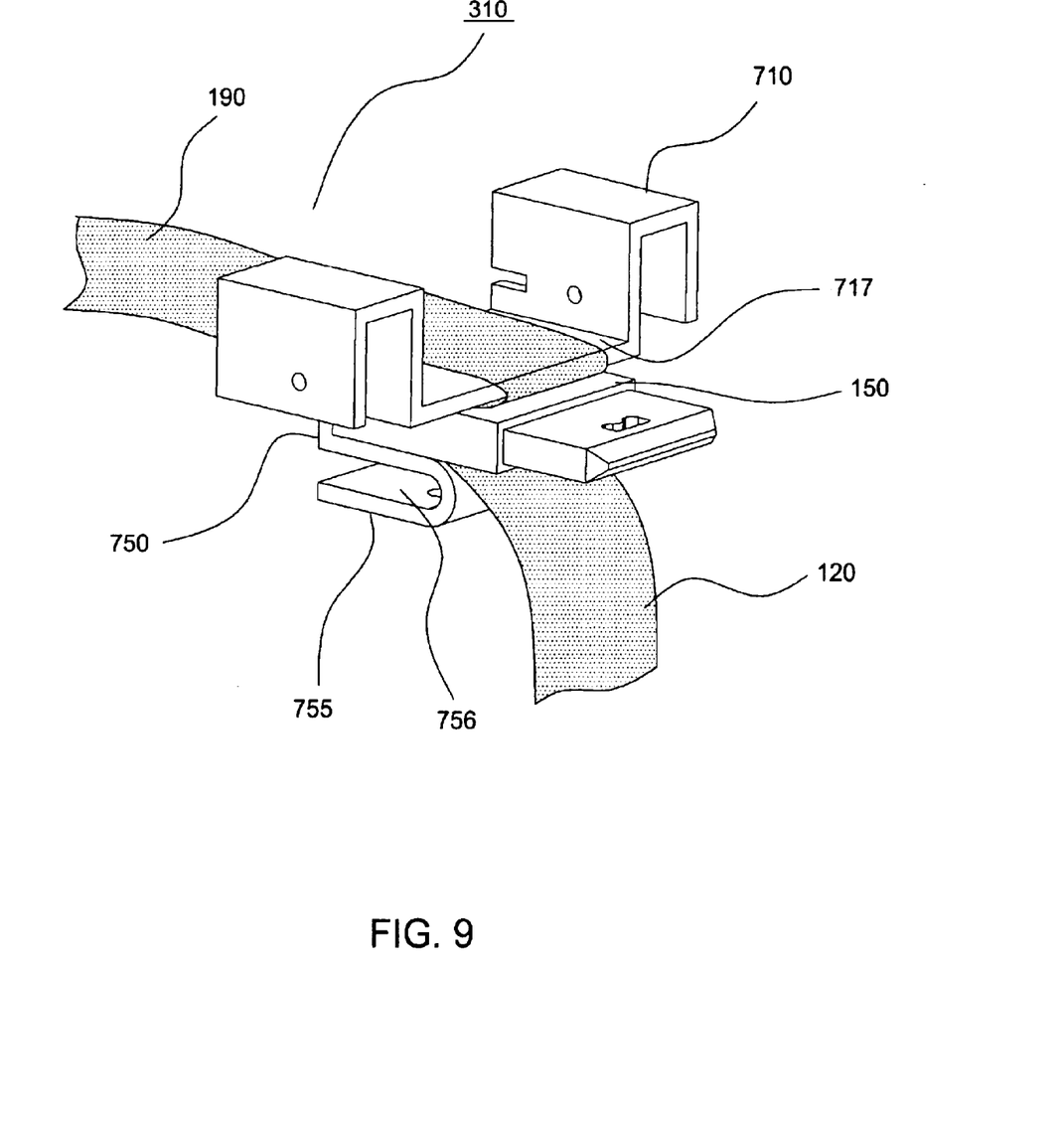
FIG. 9 depicts the installation of a cinch body to a tongue assembly of a typical, factory-installed, three-point, continuous loop seat belt system.

FIG. 9 depicts the installation of a cinch body to a tongue assembly of a typical, factory-installed, three-point, continuous loop seat belt system as in the seat belt system 100 of FIG. 1a and FIG. 1b. The rear portion of the tongue assembly 150 is inserted into the lower frame 750 of the cinch body 310 with the top face of the tongue assembly 150 facing the upper frame 710 of the cinch body 310. At this point fastening devices (e.g., screws, bolts, set screws, or the like) (not shown) are inserted first, through the third and fourth threaded cylindrical openings 759 and 760 (not shown, refer to FIG. 7) of the planar fourth side wall 756 of the lower frame 750 and on through to the first and second threaded cylindrical openings 757 and 758 (not shown, refer to FIG. 7) of the planar third side wall 755 of the lower frame 750 of the cinch body 310 to fasten the tongue assembly 150 to the lower frame 750 of the cinch body. The shoulder portion 190 of the seat belt webbing 120 is laid across the base 717 of the upper frame 710, ensuring that there are no twists in the seat belt webbing 120.

Figure 10:
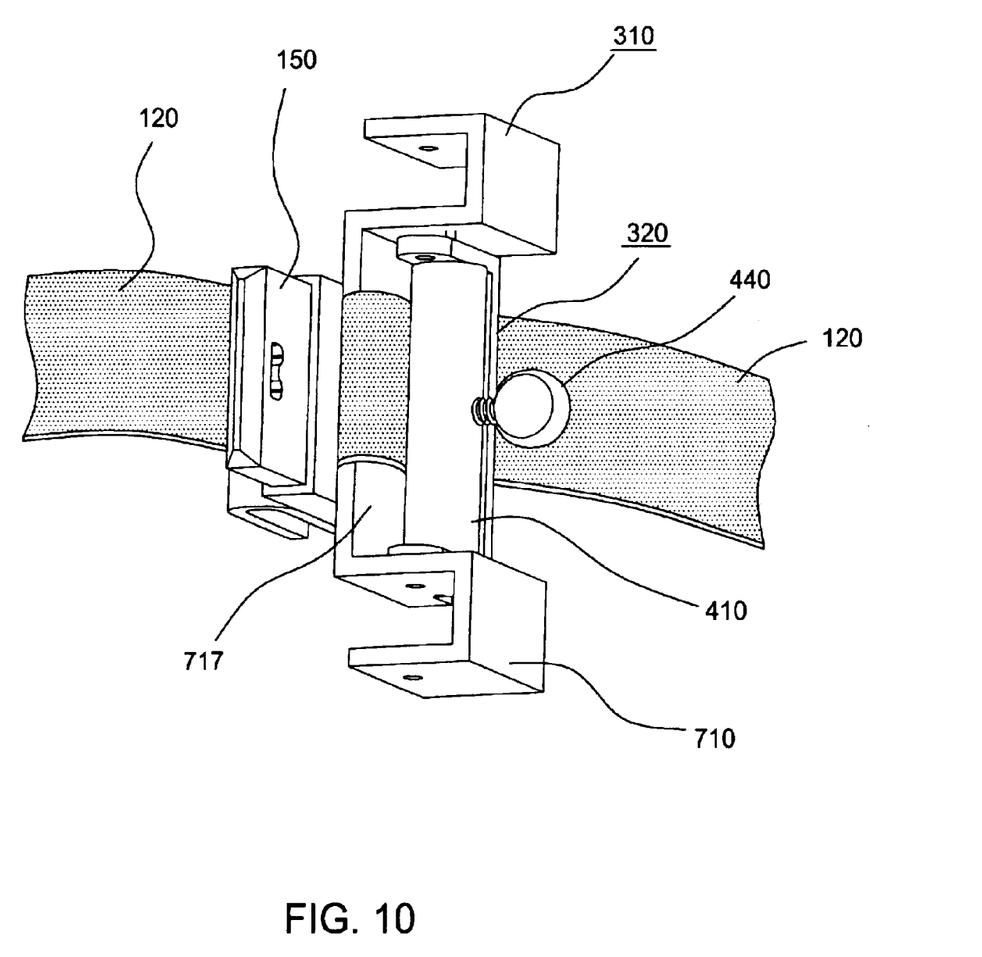
FIG. 10 depicts the installation of a cam carrier assembly to the cinch body attached to the tongue assembly of the seat belt system of FIG. 9.

FIG. 10 depicts the installation of the cam carrier assembly 320 to the cinch body 310 attached to the tongue assembly 150 of the seat belt system 100 of FIG. 9. The cam carrier assembly 320 is mounted to the cinch body 310 according to the method described above, ensuring that the seat belt webbing 120 is routed between the base 717 of the upper frame 710 of the cinch body 310 and the cam 410 of the cam carrier assembly 320. The tongue assembly 150 and the belt cinch can be moved up and down the seat belt webbing by moving the release arm 440 toward the tongue assembly 150 and sliding the tongue assembly 150 and the belt cinch together along the seat belt webbing 120. When the release arm 440 is released, the tongue assembly 150 and belt cinch are locked in place.

Although some specific materials were listed in the disclosure for manufacturing of the components of the belt cinch, it will be appreciated by those skilled in the art that the determining criteria for the material of composition for the components of the belt cinch is the strength required by the specific component in question and the materials for the manufacture of the components should not be limited to those listed herein. For example, if the cinch body were bronze, it would have to be many times thicker than if it were titanium. Or, the "U" shaped bend on the cinch body may be eliminated if made of hardened or chromium steel versus iron. Other materials for the manufacture of the components include carbon fiber, glass/epoxy/fiberglass, titanium, lucite, structural engineering plastics, magnesium, as well as others.

Figure 11:
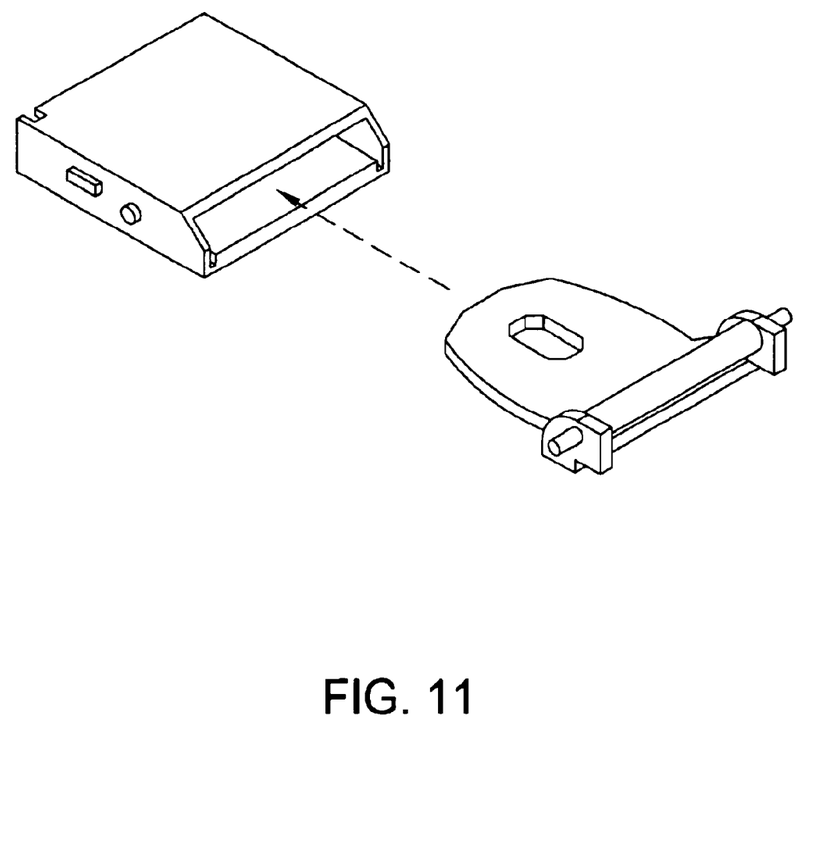
FIG. 11 depicts an alternate embodiment of a belt cinch in accordance with the present invention.

FIG. 11 depicts an alternate embodiment of a belt cinch in accordance with the present invention. In the embodiment of FIG. 11, the belt cinch is incorporated into a tongue assembly of a seat belt system. A cinch body in this embodiment is incorporated into the tongue assembly. As such, a cam carrier assembly would then be mounted to the tongue and cinch body assembly as described above for the first embodiment of a belt cinch. In another embodiment of the present invention, the cam axle can be machined as part of the cam.

In another embodiment of the present invention, the cam axle does not have to go all the way through the cam. It can be two pieces "sticking" out from each end of the cam.

In another embodiment of the present invention, the cam, cam carrier assembly, cinch body, screws, and other components may be chrome plated or anodized for aesthetics and/or to prevent corrosion or wear.

With respect to the torsion spring, it is noted that rotational tension on the cam is not strictly necessary since the cinch can be locked manually using the release arm in the reverse direction (e.g., such as in the event of a broken spring). Moreover, the energy normally applied by the torsion spring may be alternatively applied using a different type of spring, using a wire or other method or apparatus adapted to urge the cam to rotate. In fact, in one embodiment of the invention a source for such torsion is avoided. In this embodiment, a piece of foam, cloth or other material is disposed upon the body in a manner that pushes the web against the cam, thus enabling friction between the web and cam to provide the necessary force to actuate the cam.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An apparatus for locking a lap belt portion of a belt webbing in a three-point, continuous loop seat belt system which includes a tongue assembly having the belt webbing routed therethrough, said apparatus comprising:

a cinch body adapted to mount to the tongue assembly;

a cam coupled to the cinch body and adapted to urge the belt webbing against the cinch body; and means for selectively releasing the belt webbing from the cinch body and the cam while the seat belt system is under load.

2. The apparatus of claim 1, wherein said cam comprises a means for gripping said belt webbing.

3. The apparatus of claim 1, wherein said cinch body is manufactured as a single unit with the tongue assembly.

4. The apparatus of claim 3, wherein said cam is coupled to said tongue assembly.

5. The apparatus of claim 1, wherein said cam further comprises a release arm coupled to said cam for rotating said cam such that said belt webbing routed through the tongue assembly is released from the base of said cinch body allowing movement of said apparatus along the belt webbing of said seat belt system.

6. The apparatus of claim 1, wherein said cam comprises a cylindrical body portion extending axially between a first end wall and a second end wall, said cylindrical body having an off-center long axis of rotation, such that when said cam is rotated about the off-center long axis, said belt webbing is released from between said cam and said cinch body to allow free run of the belt webbing through the tongue assembly.

7. The apparatus of claim 6, wherein said cam is rotated by a release arm attached to said cam.

8. The apparatus of claim 1 wherein said cinch body comprises an upper frame and a lower frame, wherein the upper frame comprises axially spaced, oppositely disposed first and second arms separated by a base, the first arm having a first notch extending axially away from the second arm, and the second arm having a second notch extending axially away from the first arm, and wherein said first notch and said second notch being used to mount and align a cam carrier assembly to said cinch body, said cam carrier assembly housing said cam, and wherein the lower frame comprises axially spaced, oppositely disposed first and second arms, said first arm being attached to the upper frame of said cinch body, and wherein said first arm and said second arm being used to attach said tongue assembly to said cinch body.

9. The apparatus of claim 8, wherein said cam carrier assembly is mounted to said cinch body such that said belt webbing routed through the tongue assembly is locked between the base of said cinch body and said cam.

10. The apparatus of claim 8, wherein said cam carrier assembly comprises:

a cam;

a cam axle, for providing an axis of rotation for said cam;

a torsion spring, for providing a constant tension in a first direction of rotation of said cam;

a release arm, for rotating said cam in a second direction of rotation, opposite the first direction of rotation of said cam; and a main carrier body, for enabling the assembly of said cam, said cam axle, and said torsion spring which, in conjunction with said release arm, comprise said cam carrier assembly.

11. The apparatus of claim 10, wherein said main carrier body comprises an elongated, channel shaped frame with parallel, oppositely disposed arms.

12. The apparatus of claim 10, wherein said cam axle provides an off-center axis of rotation for said cam.

13. The apparatus of claim 10, wherein said cam axle is manufactured as a single unit with said cam.

14. An apparatus for locking a lap belt portion of a belt webbing in a three-point, continuous loop seat belt system which includes a tongue assembly having the belt webbing routed therethrough, said apparatus comprising:

a cinch body having an upper frame and a lower frame, wherein the upper frame comprises axially spaced, oppositely disposed first and second arms separated by a base, the first arm having a first notch extending axially away from the second arm, and the second arm having a second notch extending axially away from the first arm, and wherein said first notch and said second notch being used to mount and align a cam carrier assembly to said cinch body, and wherein the lower frame comprises axially spaced, oppositely disposed first and second arms, said first arm being attached to the upper frame of said cinch body, and wherein said first arm and said second arm being used to attach said tongue assembly to said cinch body;

said cam carrier assembly, including a cam, mounted to said cinch body such that said belt webbing routed through the tongue assembly is locked between the base of said cinch body and said cam; and release arm, coupled to said cam, for rotating said cam such that said belt webbing routed through the tongue assembly is released from the base of said cinch body allowing movement of said apparatus along the belt of said seat belt system.

15. The apparatus of claim 14, wherein said cam comprises a means for gripping said belt webbing.

16. The apparatus of claim 14, wherein said upper frame and said lower frame of said cinch body are manufactured as a single unit.

17. The apparatus of claim 14, wherein said cam rotates about an off-center axis such that when the release arm is levered, said cam releases said belt webbing from the base of said cinch body to allow free run of the belt webbing through the tongue assembly.

18. The apparatus of claim 14, wherein said cinch body is manufactured as a single unit with said tongue assembly.

19. The apparatus of claim 18, wherein said cam carrier assembly is coupled to said tongue assembly.

20. The apparatus of claim 14, wherein said cam carrier assembly further comprises:

a cam axle, for providing an axis of rotation for said cam;

a torsion spring, for providing a constant tension in a first direction of rotation of said cam;

a release arm, for rotating said cam in a second direction of rotation, opposite the first direction of rotation of said cam; and a main carrier body, for enabling the assembly of said cam, said cam axle, and said torsion spring which, in conjunction with said release arm, comprise said cam carrier assembly.

21. The apparatus of claim 20, wherein said cam axle provides an off-center axis of rotation for said cam.

22. The apparatus of claim 20, wherein said cam axle extends through said cam.

23. The apparatus of claim 20, wherein said cam axle is manufactured as a single unit with said cam.

* * * * *